July 22, 1947.　　　　R. M. STANLEY ET AL　　　　2,424,511
AIRCRAFT FLIGHT INSTRUMENT
Filed March 29, 1944

INVENTORS
ROBERT M. STANLEY AND
JOHN F. STRICKLER, JR.
BY
ATTORNEYS
Beau, Brooks, Buckley & Beau.

Patented July 22, 1947

2,424,511

UNITED STATES PATENT OFFICE 2,424,511

AIRCRAFT FLIGHT INSTRUMENT

Robert M. Stanley, Kenmore, and John F. Strickler, Jr., Williamsville, N. Y., assignors to Bell Aircraft Corporation, Buffalo, N. Y.

Application March 29, 1944, Serial No. 528,534

2 Claims. (Cl. 73—178)

This invention relates to aircraft pilot instruments, and has for one of its objects to provide an instrument for aircraft which combines in a single casing and against a single scale an indicated airspeed indicator and a safe maximum indicated airspeed based upon Mach number for the mounting aircraft.

Another object of the invention is to provide an aircraft instrument which is adapted to provide the pilot with direct readings of the indicated airspeed and the relation of the indicated airspeed to predetermined safe indicated airspeeds for the given aircraft under various flight conditions; having taken into account variances in the air pressure at different altitudes and the compressibility factors of air depending upon the indicated airspeed of the aircraft relative thereto.

Another object of the invention is to provide a device for the purpose referred to which presents to the pilot's view only a single scale and a pair of movably related pointers which show at a glance both the indicated airspeed of the aircraft and the relation of this airspeed to the maximum permissive indicated airspeed in view of the compressibility characteristics of the atmosphere through which the aircraft is operating.

Another object of the invention is to provide a flight instrument of the character aforesaid which is of structurally simple and rugged form; relatively simple and inexpensive to manufacture; easy to adjust and service, and otherwise practical in every respect. Other objects and advantages of the invention will appear in the specification hereinafter.

It is known that the maximum permissive or "safe" airspeed of an aircraft varies with the absolute temperature of the atmosphere through which the aircraft flies; and that when determining the maximum permissive airspeed of any given aircraft when flying at high speeds such as approach or exceed the speed of sound, the compressibility factor of the atmosphere must also be taken into consideration. It is also known that calculations involving the compressibility factor of air at various speeds may supply coefficient numbers known as "Mach numbers" in honor of the originator of the system; and that printed scales may be provided in the pilot cockpit to enable the pilot to read therefrom the maximum permissible speeds of the aircraft according to the altitude of flight. Thus, it has been heretofore necessary for the pilot, when desiring to check his actual indicated airspeed against the permissive maximum speeds under various altitude conditions to fiist read his altimeter and then to search a separate scale bearing altitude and corresponding permissive maximum indicated airspeed notations; and then to compare his findings with still another instrument, the airspeed indicator.

The present invention contemplates provision of a single aircraft instrument which may be constructed to present to the view of the pilot a simple scale and a pair of pointers adapted to sweep the scale. In one of its possible forms the scale may be circular and the pointers may be arranged to give the appearance of a conventional clock having only two hands. One of the pointers will indicate directly the indicated airspeed in the manner of presently conventional airspeed meter devices; while the other or "control" pointer will move independently thereof according to changes in the pressure of the atmosphere through which the aircraft is flying, and in accord with the atmosphere compressibility factor at various altitudes. Thus, the pilot need only watch the airspeed indicator to see that it does not exceed the position of the "control" indicator, in order to be assured that the aircraft is flying at not more than the maximum permissive airspeed under all altitude and compressibility factor conditions. It is not necessary, therefore, for the pilot to consult more than the single instrument of the invention to gain at a glance full information both as to his indicated airspeed and the relation thereof to the maximum permissive speed for the aircraft under the existing conditions of flight.

Figure 1:
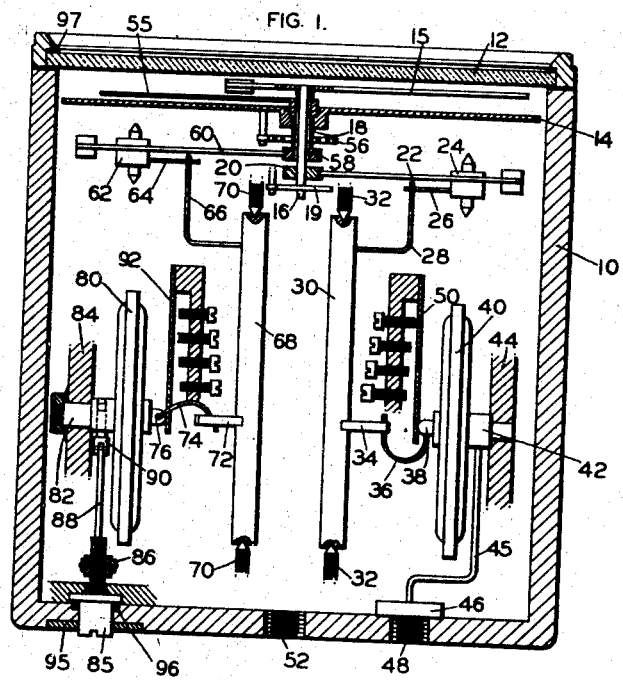
Fig. 1 is a horizontal sectional view of an instrument of the invention.
Figure 2:
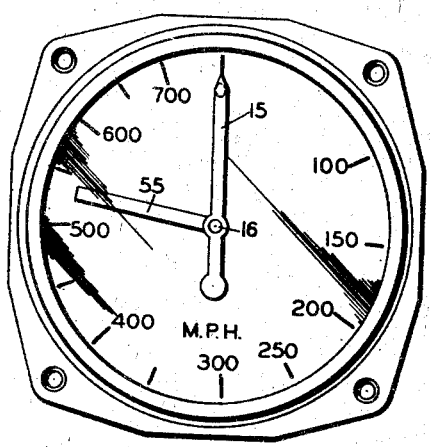
Fig. 2 is a face view, on a reduced scale, thereof.

An example of an instrument providing the features and advantages set forth hereinabove is shown in the attached drawing wherein the instrument case is designated 10; the glass window is designated 12; and the dial is indicated at 14. The dial 14 is calibrated as shown in Fig. 2 to designate airspeeds, and an airspeed pointer is shown at 15 keyed to a shaft 16 which is rotatably mounted within a sleeve 18 to extend through a suitaby apertured central portion of the dial 14 in a direction normal to the plane thereof. The sleeve 18 thus provides a bearing for the shaft 16, and is in turn rotatably mounted relative to the dial by means of a suitable bearing portion thereon. At its inner end the shaft 16 connects to one end of a coil spring 19, the other end of which connects to a stationary pedestal portion of the casing, whereby the pointer 15 will at all times be biased to return to a zero reading. The shaft 16 is keyed to a pinion 20 which meshes with a toothed sector 22 having a hub and spindle unit 24 for mounting the sector 22 upon suitable stationary bearing devices (not shown) extending from the instrument casing, whereby the sector is freely oscillatable about the vertical axis of its hub-spindle as shown in Fig. 1.

A crank arm 26 extends from the hub of the sector 22 into lateral bearing relation against an arm 28 carried by a rock shaft 30 which is mounted upon the casing 10 by means of bearings 32—32 at opposite ends of the rock shaft. The shaft 30 carries an actuating crank 34 which bears laterally against an arm 36 extending from a rigid cantilever connection at 38 with a central boss portion of one wall of a fluid pressure responsive bellows or diaphragm 40. The bellows 40 may be of any suitable "aneroid" barometer type, and is mounted by means of a boss 42 extending from its opposite side into a suitably apertured bracket 44 fixed to the instrument casing. The boss 42 is hollowed in open communication with the interior of the bellows 40 and with one end of a conduit 45 which leads in pressure-sealed relation into a reducer 46 which is threaded through the instrument casing wall at 48. The connector 48 is also adapted to receive one end of a conduit leading to the total pressure portion of a Pitot-tube device such as is usually carried by aircraft to actuate conventional airspeed indicating instruments or the like. A variable resistance spring device as indicated at 50 may be employed in conjunction with the moving end portion of the bellows 40 to control the diaphragm action thereof.

The casing 10 is apertured and threaded as indicated at 52 for connection to a tube leading to the static pressure portion of the aircraft Pitot-tube device, whereby the interior of the instrument casing 10 will be maintained at the static pressure of the atmosphere exteriorly of the aircraft. It will be understood that the bellows and crank and gear devices for actuating the airspeed indicator 15 are of standard form, and that in lieu thereof any other suitable means for causing the indicator 15 to move relative to the dial 14 to give airspeed readings may be employed. In any case, it will be preferred of course to employ in addition to the simple mechanism illustrated and described hereinabove a suitable means for correcting the airspeed indicator actuating mechanism in accord with atmosphere pressure variations.

The control or "safe" speed indicator of the instrument of the invention is illustrated at 55 to comprise a pointer fixed at one end to the sleeve 18 whereby to rotate therewith about the axis of the shaft 16; and it will be understood that the sleeve 18 will be rotatably mounted upon the dial or casing structure by means of any suitable bearing devices. A coil spring 56 is employed in conjunction with the sleeve 18 for biasing it toward zero reading position, as in the case of the shaft-spring unit 16—19. At its inner end the sleeve 18 carries a pinion 58 which meshes with a toothed segment 60 carried by a hub and spindle unit 62 so as to be rotatable about the vertical axis of the hub-spindle unit as viewed in Fig. 1 for driving the control needle 55 to oscillate about the axis of the shaft and sleeve unit 16—18. The segment hub 62 carries an arm 64 which bears laterally against a bent arm 66 carried by a rock shaft 68. The rock shaft is rotatably supported upon the casing 10 at its opposite ends by bearings 70—70, and carries a crank 72 which bears laterally against a helically bent cantilever arm 74 extending from a rigid connection at 76 with a central boss portion of one wall of a hollow spring bellows 80.

The bellows 80 is carried by a boss 82 extending through a suitably apertured bracket 84 for mounting the diaphragm in cantilever fashion upon the casing; and thus it will be understood that variances in the static atmospheric pressure externally of the diaphragm 80, as admitted to the interior of the casing 10 by the connection at 52 to the static pressure portion of the Pitot-tube device of the aircraft, will cause the diaphragm 80 to correspondingly contract or expand. Consequently, the arm 74 will push against the arm 72 to actuate the rock shaft and connected lever and gear systems to cause the control indicator 55 to oscillate in corresponding directions relative to the dial 14, and as a function of changes in the static pressure of the atmosphere through which the aircraft is flying.

It will be understood that the motion transmitting mechanisms interconnecting the bellows 80 and the pointer 55 may be of any other suitable type in lieu of the specific form thereof illustrated and described hereinabove. In any case the actuating mechanism will be so arranged as to cause the pointer 55 to shift its position relative to the dial 14 in accord with a formula based upon changes in the pressure of the atmosphere in which the aircraft is operating and in accord with consequent variances of the atmospheric forces resisting flight of the aircraft, whereby the pointer 55 will at all times designate the maximum safe airspeed of the aircraft under varying air pressure conditions. Operation of the instrument of the invention is based upon the fact that the Mach number can be expressed mathematically as a function of two pressures exerted upon a body in flight; one of the pressures being the stopped or total head pressure exerted on the Pitot tube of the airspeed meter system, and the other being the pressure of the atmosphere through which the body is travelling; as expressed in the following formula:

$$\text{Mach number} = \sqrt{\frac{2}{\gamma-1}\left[\left(\frac{P_t}{P_s}\right)^{\frac{\gamma-1}{\gamma}} - 1\right]}$$

Where $P_t$ = total, stopped or impact pressure exerted on the airspeed meter Pitot-tube.

$P_s$ = atmospheric static pressure.

$\gamma = \dfrac{C_p}{C_v}$

Where $C_p$ = specific heat of the atmosphere at constant pressure.

$C_v$ = specific heat of the atmosphere at constant volume.

Figure 3:
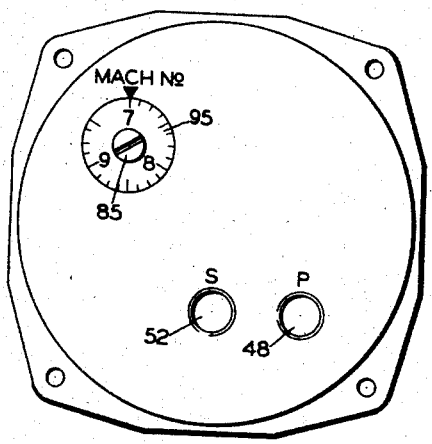
Fig. 3 is a rear view of the casing and of an adjuster device thereof.

To suit the instrument of the invention to be applied to aircraft having different permissive maximum airspeeds under similar air pressure conditions, it is arranged that the mechanism for actuating the pointer 55 may be readily adjusted. For example, as shown in Figs. 1–3, a screw head 85 may be rotatably mounted upon the instrument casing 10 to extend therethrough for engagement with a threaded nut 86 carried at one end of a strut 88. The other end of the strut 88 pivotally connects to a crank arm 90 extending radially from the bellows mounting boss 82, whereby manual rotation of the screw 85 will impose push-pull forces upon the strut 88 to cause the bellows 80 to be rotated bodily upon its mounting bracket 84. Such rotation will cause the bent arm 74 to shift its point of contact with the crank arm 72 of the rock shaft 68, whereby the effective length of the lever 72 will be varied; and in this manner the initial setting of the control indicator 55 may be varied as well as its rate of angular displacement in response to atmospheric pressure variances. As in the case of the bellows 40, operation of the bellows 80 is preferably controlled by a variable spring device as indicated at 92. The adjustment screw 85 will have in association therewith a calibrated scale 95 such as will be adapted to provide an index to the setting of the screw 85; and this index may be conveniently co-related to a Mach number series formulated to cover the range of regulator screw settings required for the various aircraft to be fitted with the instrument of the invention.

Thus, it will be understood that the invention provides an instrument comprising a single casing which may be compactly constructed and of small overall dimensions. The instrument carries a single scale presented to the view of the pilot and the usual type airspeed indicating pointer, and a "control" pointer in the background which at all times designates the maximum permissive indicated airspeed for the aircraft under the existing atmosphere pressure condition, as determined by the approved Mach number for the given aircraft. The background or "control" pointer may conveniently be specially colored, such as by painting it red; whereby it will at all times provide a ready reference to the position of the airspeed indicator, and whereby the pilot may see at a glance what relation the actual indicated airspeed bears to the permissive maximum indicated airspeed. Therefore, it will be appreciated that the instrument of the invention contributes greatly to the ease and accuracy of airflight control operations, and provides an important advance in the aircraft control instrument art.

What is claimed is:

1. In an aircraft instrument, a casing including a face arcuately calibrated in units of speed and a sealed fluid chamber, differential pressure responsive means in said chamber, means for connecting said pressure responsive means to dynamic pressure externally of said aircraft due to the speed of said aircraft, whereby said pressure actuates said pressure responsive means in opposition to pressure in said fluid chamber, means for connecting said fluid chamber to static pressure externally of said aircraft, a first pointer radially disposed with respect to said face and pivoted to move with respect to the calibrations of said face in response to changes in the pressure differential on said differential pressure responsive means, a second pressure responsive means in said chamber movable in response to changes in static pressure in said chamber, and a second pointer radially disposed with respect to said face and concentrically mounted relative to said first pointer and movable by said second pressure responsive means with respect to said first pointer and the calibration of said face, said pointers cooperating to provide a comparison of indicated airspeed and safe maximum indicated airspeed.

2. An aircraft instrument responsive to pressure conditions prevailing externally of an aircraft in flight, comprising a fluid tight housing, a plurality of indicators and an indicating face common thereto supported by said housing, means mounting said indicators in adjacent relationship to move in parallel paths to produce a differential indication visible externally of said housing, means actuating one of said indicators responsive to the difference between impact and static pressure externally of said aircraft, means actuating another of said indicators responsive to static pressure externally of said aircraft, means accessible externally of said housing for adjusting the response of the last said indicator to conform with the Mach number of an aircraft in which the instrument is to be mounted, and means defining passages for connecting said responsive means to pressure sensing means located externally of said aircraft, said indicators cooperating to provide a comparison of indicated airspeed and safe maximum indicated airspeed.

ROBERT M. STANLEY.
JOHN F. STRICKLER, Jr.

REFERENCES CITED

The following references are of record in the file of this patent:

UNITED STATES PATENTS

| Number | Name | Date |
| --- | --- | --- |
| 1,433,536 | Dugit-Gros | Oct. 31, 1922 |
| 2,277,625 | Baynes | Mar. 24, 1942 |
| 2,152,635 | Crane et al. | Apr. 4, 1939 |
| 1,504,785 | Reynolds | Aug. 12, 1924 |
| 2,024,313 | Urfer | Dec. 17, 1935 |

FOREIGN PATENTS

| Number | Country | Date |
| --- | --- | --- |
| 311,326 | Italy | Sept. 27, 1933 |
| 823,282 | France | Oct. 11, 1937 |
| 532,638 | France | Nov. 18, 1921 |
| 496,720 | France | Aug. 13, 1919 |